(12) United States Patent
Kretschmer et al.

(10) Patent No.: US 8,798,041 B2
(45) Date of Patent: *Aug. 5, 2014

(54) METHOD AND APPARATUS FOR TIME STRETCHING TO HIDE DATA PACKET PRE-BUFFERING DELAYS

(71) Applicant: AT&T Intellectual Property II, L.P., Atlanta, GA (US)

(72) Inventors: Mathias R. Kretschmer, Jersey City, NJ (US); James H. Snyder, North Plainfield, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/937,659

(22) Filed: Jul. 9, 2013

(65) Prior Publication Data

US 2013/0293773 A1 Nov. 7, 2013

Related U.S. Application Data

(63) Continuation of application No. 10/742,045, filed on Dec. 19, 2003, now Pat. No. 8,483,208, which is a continuation of application No. 09/518,677, filed on Mar. 3, 2000, now Pat. No. 6,697,356.

(51) Int. Cl.
*H04L 12/66* (2006.01)
*G10L 21/02* (2013.01)
*H04L 12/64* (2006.01)

(52) U.S. Cl.
CPC .............. *H04L 12/64* (2013.01); *H05K 999/99* (2013.01)

USPC ............ 370/352; 370/517; 370/526; 704/206

(58) Field of Classification Search
USPC ........................................................ 370/352
See application file for complete search history.

(56) References Cited

U.S. PATENT DOCUMENTS

| | | | |
|---|---|---|---|
| 4,630,262 | A | 12/1986 | Callens et al. |
| 5,450,410 | A | 9/1995 | Hluchyj et al. |
| 5,615,214 | A | 3/1997 | Chandos et al. |
| 5,784,006 | A | 7/1998 | Hochstein |
| 5,790,538 | A | 8/1998 | Sugar |
| 6,282,196 | B1 | 8/2001 | Lyons et al. |
| 6,301,258 | B1 | 10/2001 | Katseff et al. |
| 6,370,125 | B1 | 4/2002 | Belk |
| 6,377,590 | B1 | 4/2002 | Hoppal et al. |

(Continued)

OTHER PUBLICATIONS

Kazuo Unemoto, "Voice Synchronization methods for burst rate coded voice", 1989, IEEE, pp. 1879-1884.

(Continued)

*Primary Examiner* — Steven H Nguyen

(57) ABSTRACT

A special rendering mode for the first few seconds of play out of multimedia data minimizes the delay caused by pre-buffering of data packets in multimedia streaming applications. Instead of pre-buffering all incoming data packets until a certain threshold is reached, the streaming application starts playing out some of the data packets immediately after the arrival of the first data packet. Immediate play out of the first data packet, for example, results in minimum delay between channel selection and perception, thereby allowing a user to quickly scan through all available channels to quickly get a notion of the content. The immediate play out is done at a reduced speed.

20 Claims, 3 Drawing Sheets

(56) References Cited

U.S. PATENT DOCUMENTS

| | | |
|---|---|---|
| 6,377,931 B1 | 4/2002 | Shlomot |
| 6,584,104 B1 | 6/2003 | McGowan |
| 6,697,356 B1 * | 2/2004 | Kretschmer et al. .......... 370/352 |
| 6,775,649 B1 | 8/2004 | DeMartin |
| 8,483,208 B1 * | 7/2013 | Kretchmer et al. ........... 370/352 |

OTHER PUBLICATIONS

DeMartin, "Improved Frame Erasure Concealment for CELP based coder", Sep. 1, 1999, U.S. Appl. No. 60/167,198, pp. 1-4.

DeMartin, "Improved Frame Erasure Concealment for Speech Transmission", Nov. 23, 1999, U.S. Appl. No. 60/151,846, pp. 15.

* cited by examiner

METHOD AND APPARATUS FOR TIME STRETCHING TO HIDE DATA PACKET PRE-BUFFERING DELAYS

PRIORITY INFORMATION

The present application is a continuation of U.S. patent application Ser. No. 10/742,045, filed Dec. 19, 2003, which is a continuation of Ser. No. 09/518,677, filed Mar. 3, 2000, now U.S. Pat. No. 6,697,356, issued on Feb. 24, 2004, the contents of which are incorporated herein by reference in their entirety.

BACKGROUND OF THE INVENTION

1. Field of Invention

This invention relates to a method and apparatus for hiding data packet pre-buffering delays in multimedia streaming applications.

2. Description of Related Art

Currently, multimedia applications which transmit blocks of data from a source to a destination, e.g., datagram networks, without quality of service (QoS) guarantees have to build up a First-In, First-Out (FIFO) buffer of incoming packets to cope with problems associated with delay jitters, disordered packets, etc. These problems occur in the network layer; therefore, streaming applications are unable to eliminate them. Conventional multimedia streaming applications try to hide these delay jitters, disordered packets, etc. by pre-buffering data packets for several seconds before playing them out. However, this pre-buffering introduces a delay between selection and perception of a channel. For example, when a subscriber uses multimedia applications in datagram networks to play music, the subscriber may have to wait several seconds after a channel is selected before the subscriber hears any music. If existing implementations were to initiate play out immediately, the conventional multimedia streaming applications would generally not have any packets to play out. The user would, in the case of audio rendering, hear distortions such as pops and clicks or interspersed silence in the audio output.

SUMMARY OF THE INVENTION

This invention provides a special transient mode for rendering multimedia data in the first few seconds of play out, while minimizing both the distortion of the output and the delay between selection and play out caused by pre-buffering of data packets in multimedia streaming applications. Instead of pre-buffering all incoming data packets until a certain threshold is reached, the streaming application starts playing out some of the multimedia stream immediately after the arrival of the first data packet. Immediate play out of the first data packet, for example, results in minimum delay between channel selection and perception, thereby allowing a user to quickly scan through all available channels to quickly get a notion of the content. For example, when a subscriber selects a music channel when using multimedia applications in data gram networks, the subscriber can almost immediately hear a selected channel.

This immediate play out of data packets is done at a reduced speed with less than all in coming data packets. For example, if ten data packets are to be received, the first data packet can be played out immediately upon receipt. The remaining nine data packets can be pre-buffered in the background of this immediate play out. The reduced speed play out, e.g., slow mode, can continue until the buffer reaches a predetermined limit in the background. Instead of playing out every actual data packet in sequence after the initial data packet play out, fill packets can be inserted between the actual data packets.

The fill packets are packets synthesized from the earlier packets received from the channel or station and are used to stretch the initial few seconds of play back time in a pitch-preserving, or nearly pitch-preserving, fashion. For example, the first three seconds of received signals can be augmented by six seconds of synthesized signals which together result in a rendering out of over nine seconds of play out instead of the original three seconds.

Since data packets continue to arrive during the rendering of the augmented signals, e.g., during the excess six seconds in the example above, the rendering engine accumulates a buffer of packets which can allow the system to handle delay jitters and disordering of data packets. That is, after an initial interval of a few seconds in which the augmentation occurs, the number of data packets synthesized decreases as the buffer fills. Eventually, when the buffer is filled, synthesis ceases and the rendering proceeds as normal.

Audio and video signals generally contain considerable redundancy. The removal of such redundancy is the focus of modem source coding, i.e., signal compression, techniques. In many cases, there is redundancy not only within the frames encapsulated by a single packet, but also between frames encapsulated by two or more packets. The redundancy implies that in such cases a given packet may be predicted more or less from its neighboring packets.

This predictability may be calculated either in an objective classical signal-to-noise ratio (SNR) sense, or may be determined in a quasi-subjective way, via a perceptual model, e.g., as perceptual entropy, or in other ways previously developed or yet to be developed.

In order to reproduce a signal that is as close to an original signal as possible, the decision on which actual data packets to repeat as fill packets and how often is based on the signal's perceptual entropy. The better the perceptual entropy, the less likely that the actual data packet will be repeated as a fill packet. In order for the synthesized packets used to augment the initial rendered packets to introduce minimal distortion into the rendered, e.g., audio, signal, fill packets are synthesized from the subset of initial packets in which the predictability is known to be high, either from side information in the stream or by inference from data in the packet.

Time stretching usually causes some loss in signal quality, but the insertion of fill packets in the special rendering mode offers a signal quality that is good enough for the user to readily get an idea of the content of the selected channel without experiencing a long delay, while at the same time building a buffer of accumulated packets that allow the rendering system to improve the quality to a level provided by standard stream buffering techniques. After a few seconds of the special rendering mode, during which the application has pre-buffered actual data packets in the background, the system can seamlessly switch from the reduced speed mode to the real play out mode without user involvement, for example. These and other aspects of the invention will be apparent or obvious from the following description.

BRIEF DESCRIPTION OF THE DRAWINGS

The invention is described in detail with reference to the following figures, wherein like numerals reference like elements, and wherein.

DETAILED DESCRIPTION OF PREFERRED EMBODIMENTS

The invention is described below in connection with a computer system. That is, as described below, subscribers select various channels to request multimedia streaming applications in data gram networks. However, it will be appreciated that the invention can be used with other types of communication systems, including wired and wireless communication systems, telecommunication systems, cable or other similar networks that transmit data packets.

Likewise, the term subscriber refers to any person or entity, such as a group of individuals or a computer, radio, television or other device that receives multimedia communications. Thus, the term subscriber is not restricted to including only human users in a computer network.

Figure 1:
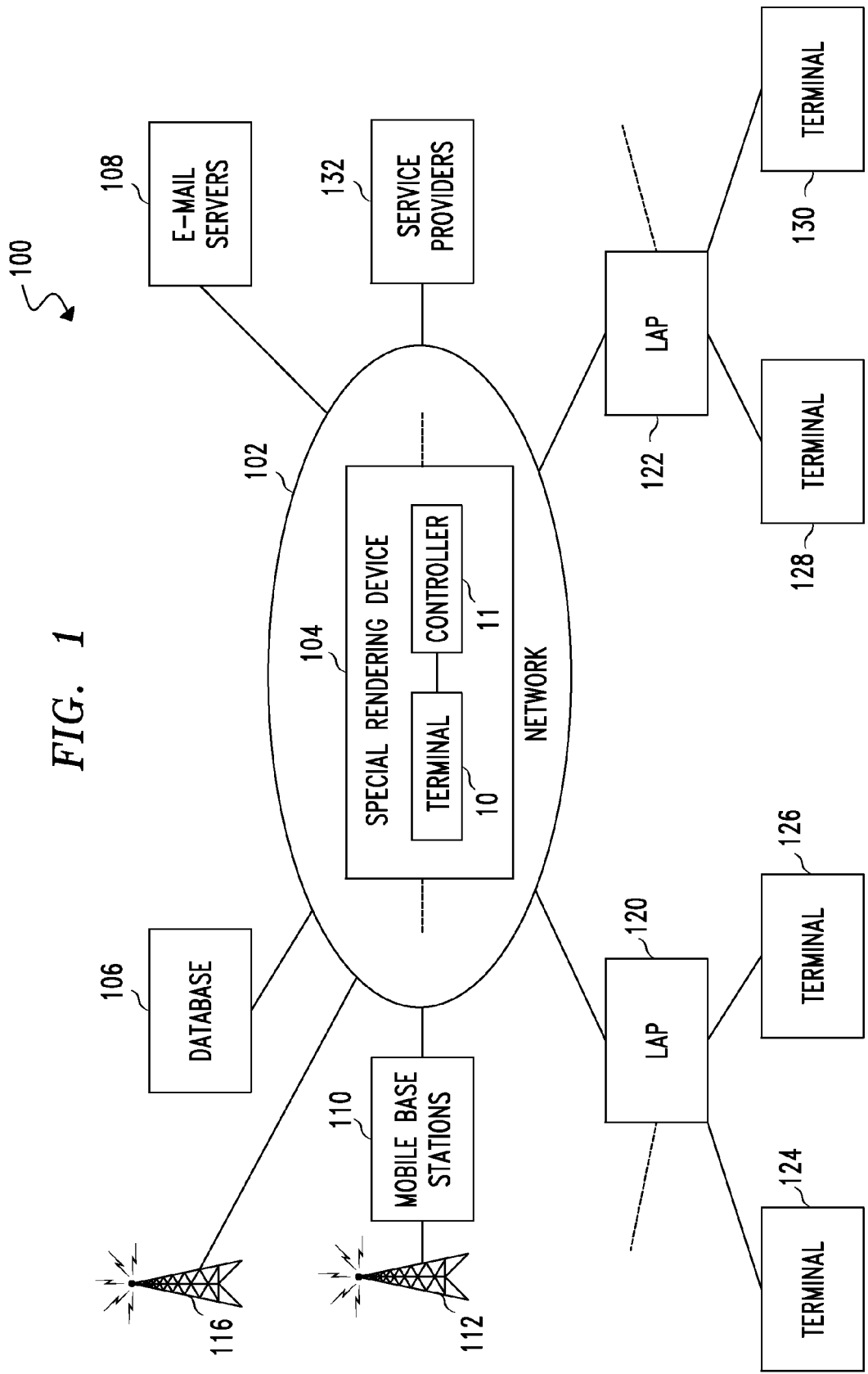
FIG. 1 illustrates an exemplary diagram of a time stretching system.

FIG. 1 shows an exemplary block diagram of a time stretching system 100. The time stretching system 100 includes a network 102, coupled to: a database 106, an e-mail server 108, service providers 132, portable communication devices such as a cellphone via mobile base stations 110 and towers 112, pagers via paging towers 116, terminals 124-130 (e.g., telephone stations, personal computers, etc.) via local access providers (LAP) 120 and 122, and a special rendering mode device 104, which can include a terminal 10 and a controller 11.

The network 102 may include a telephone network (e.g., local and/or long distance), a datagram network (e.g., transmitting blocks of data from source to destinations), a data network such as the Internet, or other wired or wireless networks either private or public. The LAPs 102 and 122 maybe local exchange carriers or other network interfaces such as Internet Service Providers.

The controller 11 need not be a single contiguous entity. Instead, the controller 11 can be implemented, at least in part, as a plurality of general purpose data processors and/or a single special purpose integrated circuit (e.g., ASIC) or an array of ASICs each having a main or central processor section for overall, system-level control, and separate sections dedicated to performing various specific computations, functions and other processes under the control of the central processor section. The controller 11 can also be implemented using, or including, a plurality of separate dedicated programmable integrated or other electronic circuits or devices, e.g., hard-wired electronic or logic circuits, such as discrete element circuits or programmable logic devices. The controller 11 also preferably includes other devices, such as volatile or non-volatile memory devices, communication devices, and/or other circuitry or components necessary to perform the desired input/output or other functions. For example, the controller 11 can include an interface, such as a user interface including a keyboard, monitor, user pointing device, etc. that allows an operator to input information in to and receive information from the controller 11. The interface may also include other communications devices, including modems or other data communication devices to allow the controller 11 to receive and send information with respect to switches or otherwise. The terminal 10 can be any multipurpose type terminal capable of receiving data.

A subscriber to the time stretching system 100 may subscribe to many other services. For example, the subscriber may subscribe to an Internet service which provides for transmitting blocks of data in multimedia streaming applications, and other types of services.

Figure 2:
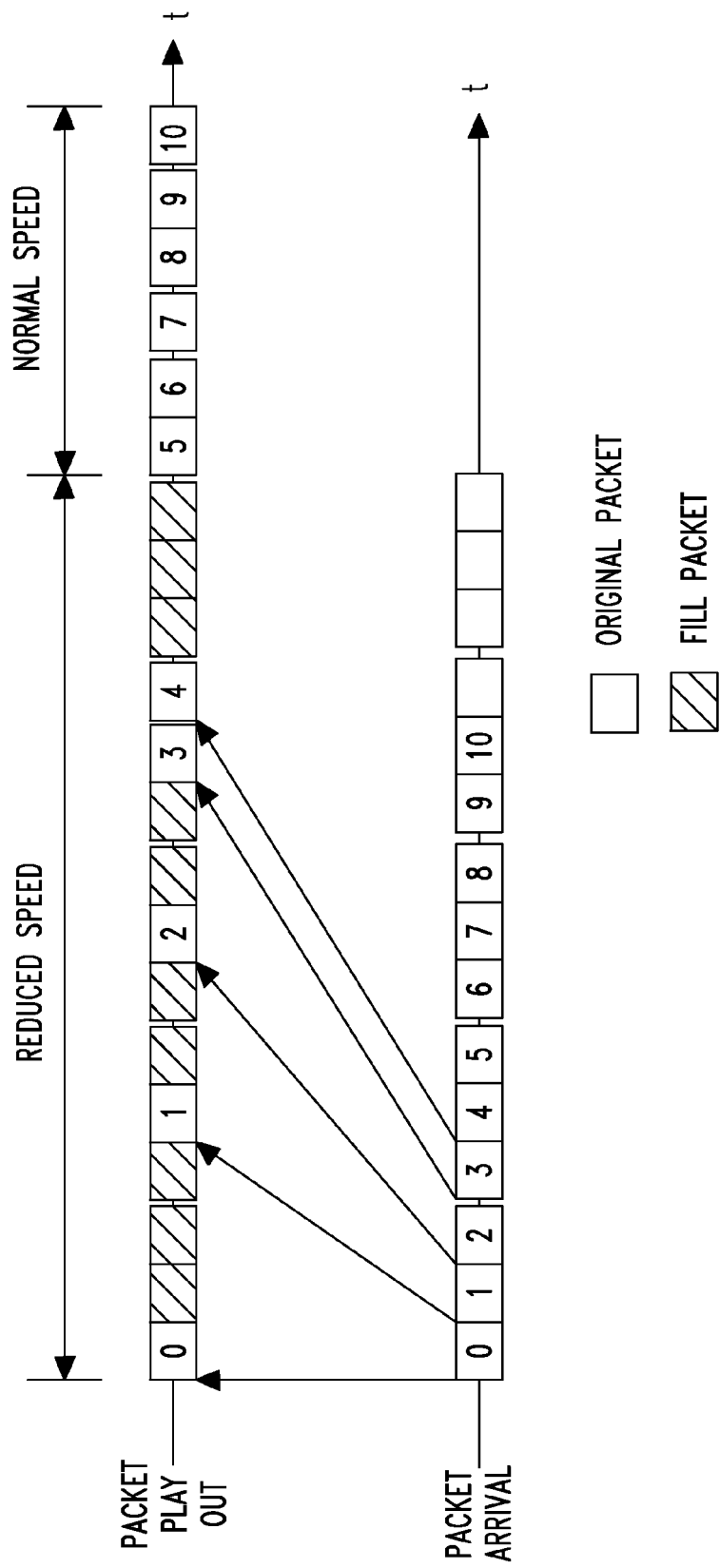
FIG. 2 illustrates an exemplary diagram for a time stretching special rendering mode.

FIG. 2 shows an exemplary diagram for the time stretching special rendering mode 104. In the time stretching special rendering mode 104, data packets arrive in the same interval as data packets are played out. In addition, there preferably is no pre-buffering of the data packet that is initially played out. For example, when data packet 0 arrives, in that same interval, data packet 0 is played out. However, data packet 0 can be played out at less than actual speed to buy time in order to pre-buffer other incoming data packets.

By subjecting data packet 0 to time stretching, e.g., double play out, data signal extrapolation, or other kinds of data manipulations, data packet 0 is played out in a fashion very closely resembling the original signal but at a reduced speed. For example, data packet 0 can be stretched from 100 ms to 200 ms. However, this type of time stretching is not a fixed value, i.e., data packet 0 can be stretched three times its duration, 50% more, or any variable thereof. The quality of this immediate play out of data packet 0 is sufficient to give the user a quick notion of his or her selection. After playing out data packet 0 at a reduced speed, a fill packet can be subsequently played out. The fill packets can be generated from previously played out data packets, pre-buffered data packets, or a combination of the two, and can be repeatedly played out, if desired.

As further illustrated in FIG. 2, original data packet 1 can be played out after the first fill packet. The play out of original data packet 1 can be performed in a time interval subsequent to the arrival of original data packet 1. Similarly, original data packets 2, 3 and 4 can be played out in a time interval subsequent to the arrival of the respective data packets. Fill packets can be inserted in between the actual data packets. Which actual packets to repeat as fill packets and how many times the fill packets are repeated depends upon the perceptual entropy in each respective data packet or data packets being analyzed. The better the perceptual entropy, the less likely a data packet will be repeated as a fill packet.

In the back ground of playing out data packets using the special rendering mode 104, data packets are pre-buffered. Pre-buffering is necessary because of the problem in data gram networks associated with delay jitters and disordered packets. For example, if 10 data packets are to be received, one data packet is immediately played out and nine data packets can be buffered in a FIFO while the first data packet and/or fill packets are played out. After some data packets are pre-buffered, the system can switch to the normal rendering mode which is done at actual speed.

Figure 3:
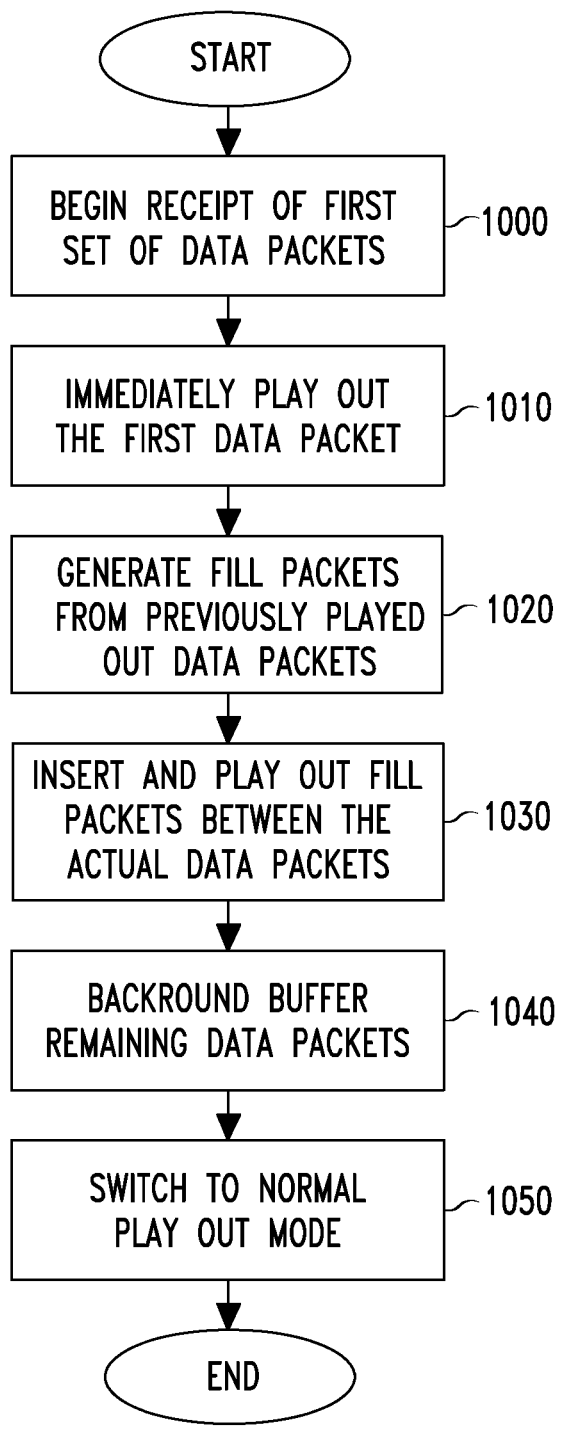
FIG. 3 shows a flow chart of an exemplary process of the time stretching system.

FIG. 3 shows a flowchart for a process of the special rendering mode 104. In step 1000, receipt of a first set of data packets is begun. In step 1010, at least one of the received data packets is immediately played out, eliminating silence in the beginning of play out. The immediate rendering of at least one data packet can be done at a reduced speed for a desired time, e.g., the first few seconds. This reduced speed play out of at least one data packet preferably resembles the play out of all actual data packets to be received or some subset of received data packets.

At step 1020, fill packets are ideally generated from previously played out data packets. The fill packets hide the delays caused by pre-buffering. Since data packets arrive in the same interval as packets are rendered, every fill packet buys time to pre-buffer an actual data packet.

At step 1030, fill packets are inserted and played out between actual data packets. Inserting the fill packets between the actual data packets causes a time stretching effect because for a time period data packets are being repeated, stretched, or manipulated in other ways at a reduced speed. Instead of rendering every data packet, a combination of actual data packets and fill packets can be rendered.

However, while playing out at least one of the data packets, the system can simultaneously pre-buffer the remaining data packets in step 1040. The data packets that are not played out immediately are pre-buffered in the background, unbeknown to the subscriber. This is because during the special rendering of data packets in accordance with the invention more data packets are received than are actually play out. There is a need to constantly buffer data packets in the background because of delay jitter problems in the network layer.

At step 1050, after the buffer is sufficiently filled, the system can switch to normal play out speed. The switch over from reduced play out to normal play out is preferably unnoticeable to the user.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

The invention claimed is:

1. A method comprising:
 upon identifying a first packet in a plurality of data packets, immediately playing the first data packet without delay; and
 while playing the first data packet, generating fill packets associated with the first data packet; and
 after playing the first data packet, and before playing a second data packet directly following the first data packet in the plurality of data packets, playing the fill packets, wherein a number of fill packets played is associated with perceptual entropy of the first data packet.

2. The method of claim 1, wherein a buffering delay is hidden by the fill packets.

3. The method of claim 1, wherein the fill packets mirror the first data packet.

4. The method of claim 1, wherein a stronger perceptual entropy corresponds to less repetition of the first data packet.

5. The method of claim 1, wherein while playing the first data packet, the method further comprises receiving additional packets in the plurality of data packets.

6. The method of claim 5, wherein while playing the first data packet, the method further comprises buffering the additional packets in a buffer.

7. The method of claim 1, further comprising switching, after playing the first data packet, from a first speed used to play the first data packet to a second speed to play the second data packet, wherein the first speed is slower than the second speed.

8. The method of claim 1, further comprising:
 receiving additional data packets while playing the first data packet;
 placing the additional data packets into a buffer; and
 triggering play of the second data packet when the buffer is sufficiently full.

9. A system comprising:
 a processor; and
 a computer-readable storage medium having instructions stored which, when executed by the processor, result in the processor performing operations comprising:
 upon identifying a first packet in a plurality of data packets, immediately playing the first data packet without delay; and
 while playing the first data packet, generating fill packets associated with the first data packet; and
 after playing the first data packet, and before playing a second data packet directly following the first data packet in the plurality of data packets, playing the fill packets, wherein a number of fill packets played is associated with perceptual entropy of the first data packet.

10. The system of claim 9, wherein a buffering delay is hidden by the fill packets.

11. The system of claim 9, wherein the fill packets mirror the first data packet.

12. The system of claim 9, wherein a stronger perceptual entropy corresponds to less repetition of the first data packet.

13. The system of claim 9, wherein while playing the first data packet, the method further comprises receiving additional packets in the plurality of data packets.

14. The system of claim 13, wherein while playing the first data packet, the method further comprises buffering the additional packets in a buffer.

15. The system of claim 9, the computer-readable storage medium having additional instructions stored which result in the operations further comprising switching, after playing the first data packet, from a first speed used to play the first data packet to a second speed to play the second data packet, wherein the first speed is slower than the second speed.

16. The system of claim 9, the computer-readable storage medium having additional instructions stored which result in the operations further comprising:
 receiving additional data packets while playing the first data packet;
 placing the additional data packets into a buffer; and
 triggering play of the second data packet when the buffer is sufficiently full.

17. A computer-readable storage device having instructions stored which, when executed by a computing device, result in the computing device performing operations comprising:
 upon identifying a first packet in a plurality of data packets, immediately playing the first data packet without delay; and
 while playing the first data packet, generating fill packets associated with the first data packet; and
 after playing the first data packet, and before playing a second data packet directly following the first data packet in the plurality of data packets, playing the fill packets, wherein a number of fill packets played is associated with perceptual entropy of the first data packet.

18. The computer-readable storage device of claim 17, wherein a buffering delay is hidden by the fill packets.

19. The computer-readable storage device of claim 17, wherein the fill packets mirror the first data packet.

20. The computer-readable storage device of claim 17, wherein a stronger perceptual entropy corresponds to less repetition of the first data packet.

* * * * *